(12) United States Patent
Apostolo et al.

(10) Patent No.: US 7,393,906 B2
(45) Date of Patent: Jul. 1, 2008

(54) PERFLUORINATED POLYMERS

(75) Inventors: Marco Apostolo, Novara (IT); Francesco Triulzi, Milan (IT); Vincenzo Arcella, Milan (IT)

(73) Assignee: Solvay Solexis S.p.A., Milan (IT)

( * ) Notice: Subject to any disclaimer, the term of this patent is extended or adjusted under 35 U.S.C. 154(b) by 13 days.

(21) Appl. No.: 11/640,862

(22) Filed: Dec. 19, 2006

(65) Prior Publication Data

US 2007/0123671 A1    May 31, 2007

Related U.S. Application Data

(62) Division of application No. 10/823,771, filed on Apr. 14, 2004, now Pat. No. 7,199,199.

(30) Foreign Application Priority Data

Apr. 15, 2003 (IT) .............................. MI03A0774

(51) Int. Cl.
C08F 16/24 (2006.01)

(52) U.S. Cl. .................. 526/247; 526/89; 526/243; 428/14; 430/270.1

(58) Field of Classification Search .............. 526/247, 526/89, 243; 428/14; 430/270.1
See application file for complete search history.

(56) References Cited

U.S. PATENT DOCUMENTS

| | | | |
|---|---|---|---|
| 3,865,845 A | | 2/1975 | Resnick |
| 4,558,141 A * | | 12/1985 | Squire ........................ 549/455 |
| 4,743,658 A | | 5/1988 | Imbalzano et al. |
| 4,789,717 A | | 12/1988 | Giannetti et al. |
| 4,864,006 A | | 9/1989 | Giannetti et al. |
| 4,966,435 A | | 10/1990 | Matsumoto et al. |
| 4,990,283 A | | 2/1991 | Visca et al. |
| 5,051,114 A * | | 9/1991 | Nemser et al. ................. 95/47 |
| 5,378,782 A * | | 1/1995 | Grootaert .................... 526/255 |
| 5,495,028 A * | | 2/1996 | Navarrini et al. ............ 549/455 |
| 5,646,223 A * | | 7/1997 | Navarrini et al. ............ 526/247 |
| 5,883,177 A * | | 3/1999 | Colaianna et al. ........... 524/462 |
| 5,883,477 A | | 3/1999 | Wilber |
| 6,723,152 B2 * | | 4/2004 | Bikson et al. .................. 95/45 |
| 6,828,388 B2 * | | 12/2004 | Tortelli et al. ............ 525/326.4 |
| 2004/0242820 A1* | | 12/2004 | Arcella et al. ............... 526/247 |

FOREIGN PATENT DOCUMENTS

| | | |
|---|---|---|
| EP | 0 076 581 | 4/1983 |
| EP | 80187 A2 * | 6/1983 |
| EP | 0 633 257 | 6/1994 |
| EP | 633257 A1 * | 6/1994 |
| EP | 0 645 406 | 3/1995 |
| EP | 0 803 557 | 10/1997 |
| EP | 803557 A1 * | 10/1997 |
| EP | 1 256 592 | 11/2002 |

OTHER PUBLICATIONS

WO 89/12240, published Dec. 14, 1989.
Pianca, Maurizio, et al., "End groups in Fluoropolymers." Journal of Fluorine Chemistry 95, 1999, pp. 71-84.

* cited by examiner

*Primary Examiner*—Peter D. Mulcahy
*Assistant Examiner*—Henry Hu
(74) *Attorney, Agent, or Firm*—Arent Fox LLP

(57) ABSTRACT

Amorphous perfluorinated homopolymers and copolymers of perfluorodioxoles of formula (IA):

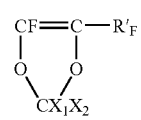

(IA)

wherein $R'_F$ is equal to $R_F$ or $OR_F$ wherein $R_F$ is a linear or branched perfluoroalkyl radical having 1-5 carbon atoms; $X_1$ and $X_2$, equal to or different from each other, are F, $CF_3$; said polymers having a dioxole content $\geq 95\%$ by moles, having the following property combination:

Tg, measured according to the ASTM 3418 (DSC) method, from 180° C. to 195° C.;

intrinsic viscosity, measured at the temperature of 30° C. in perfluoroheptane (Galden® D80) according to the ASTM D 2857-87 method, from 13 cc/g to 100 cc/g.

15 Claims, No Drawings

PERFLUORINATED POLYMERS

This is a divisional of U.S. patent application Ser. No. 10/823,771, filed Apr. 14, 2004 now U.S. Pat. No. 7,199,199, which claims priority benefit to MI2003 A 000774, filed Apr. 15, 2003. The disclosure of all applications is hereby incorporated by reference in their entirety.

The present invention relates to amorphous polymers and process for their preparation, said polymers comprising cyclic units deriving from fluorodioxoles of formula:

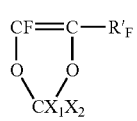
(IA)

wherein $R'_F$ is equal to $R_F$ or $OR_F$ wherein $R_F$ is a linear or branched perfluoroalkyl radical having 1-5 carbon atoms, preferably $R'_F=OCF_3$; $X_1$ and $X_2$, equal to or different from each other, are F, $CF_3$;

said polymers optionally containing units deriving from comonomers containing at least one unsaturation of ethylene type; the cyclic units being $\geq 95\%$ by moles, more preferably $>97\%$ by moles, still more preferably being 100% by moles.

Said polymers unexpectedly and surprisingly show a high Tg combined with good mechanical properties. The combination of said properties allows to have available amorphous perfluorinated polymers allowing to prepare coatings, membranes and manufactured articles for optical applications. In particular manufactured articles for optical applications in the wave length range 600-1800 nm, preferably 1300-1550 nm.

These polymers have a very high selectivity and permeability to gases. Said properties make them particularly useful to prepare membranes having a high efficiency for the gas separation.

More specifically the present invention relates to amorphous perfluoropolymers of perfluorodioxole of formula (IA) wherein $R'_F=OR_F$ e $R_F=CF_3$, $X_1=X_2=F$ (perfluorodioxole called TTD), wherein TTD $\geq 95\%$ by moles and having a Tg higher than 180° C., combined with good mechanical properties, as, for example, the release without breaking of the polymer film from a support where it has been formed.

More specifically the present invention relates to TTD homopolymers having a Tg higher than 190° C. combined with the above mechanical properties.

TTD is a perfluorodioxole having formula

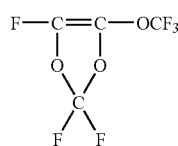
(I)

The TTD is a monomer widely used in the polymer field since it is capable to easily copolymerize with TFE (U.S. Pat. No. 5,883,177), giving polymers usable, for example, to obtain coatings, membranes and manufactured articles for optical applications.

Various structures of fluorodioxoles have been described in the prior art. U.S. Pat. No. 3,865,845 describes the perfluorodimethyldioxole (PDD) of formula:

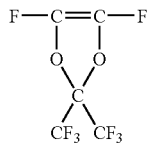

EP 76,581 has as an object the following class of halogen-perfluoroalkyl dioxoles:

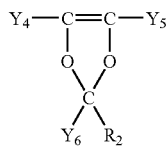

wherein $Y_4$, $Y_5$ and $Y_6$ are F or Cl, while $R_2$ is a perfluoroalkyl radical having from 1 to 4 carbon atoms.

EP 80,187 relates to 2,2,4,5-tetrafluoro-1,3-dioxole (PD) of formula:

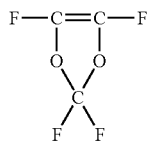

The dioxoles of the PD and PDD type do not show reactivity problems in polymerization, in fact the PD reactivity is so high that it tends to spontaneously homopolymerize. The drawback of these dioxoles is that for obtaining manufactured articles they show a poor solubility in fluorinated solvents, whereby it must be used in solutions with very diluted polymer concentrations. Besides, the viscosities are too high. This limits, for example, the applications of optical type, wherein polymer purification processes as, for example, that described in EP 1.256.592, are required.

TTD fluoropolymers are also known in the prior art. The drawback of these polymers is that they do not show a high Tg and in particular they do not show good mechanical properties when the TTD amount is high, for example higher than 95% by moles. Furthermore the mechanical properties are very poor and do not allow the production of manufactured articles for optical applications and for the preparation of films and membranes. In particular TTD copolymers and homopolymers are described in U.S. Pat. No. 5,495,028. The Examples illustrate that said polymers are prepared by polymerization in solvent or in mass. In particular the synthesis of a TTD homopolymer having a Tg of 162° C. by mass polymerization is described. In the patent it is stated that the TTD homopolymers have a low refractive index and that they are suitable for preparing optical fibers. Tests carried out by the Applicant have shown that the TTD homopolymers of the prior art do not possess suitable mechanical properties for the use in optical applications. In U.S. Pat. No. 5,883,177 TTD copolymers are described and also the TTD homopolymers are mentioned, without exemplifying them. The copolymers are prepared by microemulsion polymerization in AISI 316 steel reactors according to the process commonly used in the art to polymerize fluorinated monomers. Tests carried out by the Applicant have shown that with the polymerization in microemulsion in steel reactors, TTD homopolymers are obtained having a low Tg and mechanical properties not suitable for optical applications and for the preparation of films and membranes. For example, when the film has been prepared on a support by casting from solvent, said film has a poor mechanical consistency, so that the film release from the support is difficult: the film breaks. See the comparative Examples.

Amorphous perfluorinated copolymers with TTD≧95% prepared according to the teachings of the prior art are not suitable for optical applications. Amorphous TTD perfluorinated polymers are characterized by a high transparency in a wide wave-length range, in particular in the IR spectrum comprised between 600 and 1800 nm, preferably between 1300 and 1550 nm. However to be used in optical applications they must contain the lowest possible amount of unstable ionic end groups, mainly of —COF and —COOH type, as they reduce the TTD homopolymer transmittance in the above wave length range.

One of the methods used to neutralize acid end groups in polymers is by fluorination: the fluorinating agent is generally elemental fluorine, but also other fluorinating agents are used.

The polymer can be fluorinated in solid form as described in U.S. Pat. No. 4,743,658, or dissolved in solvents stable to fluorination, as described in EP 919 060. Both treatments are carried out at high temperatures, in particular of the order of 200° C., with fluorine diluted with inert gas. Or, before the fluorination, a pre-treatment of the end groups with tertiary amines or alcohols can be carried out to facilitate the subsequent fluorination. The temperatures are in the range 75° C.-200° C. and must be lower than the polymer Tg. See WO 89/12240 and U.S. Pat. No. 4,966,435.

With said methods of the prior art it is obtained a reduction of unstable ionic end groups, in particular COF, COOH, their esters, salts or amidic derivatives, but not a complete elimination thereof.

According to the fluorination process in solution in the presence of UV radiation described in the patent application EP 1,256,591 in the name of the Applicant, it is possible to obtain perfluorinated amorphous polymers substantially free from said ionic end groups.

The need was felt to have available homopolymers and copolymers of formula (IA), usable for obtaining coatings, membranes and manufactured articles for optical applications and for gas separation, having the following combination of properties:
good mechanical properties, for example film release from the support without cracks;
high Tg, higher than 170° C., to allow the use at high temperatures;
optionally, complete absence of peaks in the spectrum attributable to unstable ionic end groups —COOH and/or —COF, preferably if subjected to fluorination in solution in the presence of UV radiation according to the EP 1,256,591 method.

It is an object of the present invention amorphous perfluorinated homopolymers and copolymers of perfluorodioxoles of formula (IA):

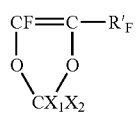

(IA)

wherein R'$_F$ is equal to R$_F$ or OR$_F$ wherein R$_F$ is a linear or branched perfluoroalkyl radical having 1-5 carbon atoms, preferably R'$_F$=OCF$_3$; X$_1$ and X$_2$, equal to or different from each other, are F, CF$_3$;

wherein the dioxole content is ≧95% by moles, having the following combination of properties:
Tg, measured according to the ASTM 3418 (DSC) method, from 180° C. to 195° C., preferably from 190° C. to 192° C.;
intrinsic viscosity, measured at the temperature of 30° C. in perfluoroheptane (Galden® D80) according to the ASTM D 2857-87 method, higher than 13 cc/g, generally up to 100 cc/g.

Among the perfluorodioxoles of formula (IA) the preferred one is TTD wherein R'$_F$=OCF$_3$; X$_1$=X$_2$=F; the TTD homopolymers are preferred among polymers.

The comonomers usable in the preparation of the copolymers of the present invention are, for example, one or more of the following:
C$_2$-C$_8$ perfluoroolefins, as tetrafluoroethylene (TFE), hexafluoropropene (HFP);
perfluoroalkylvinylethers (PAVE) CF$_2$=CFOR$_f$, wherein R$_f$ is a C$_1$-C$_6$ perfluoroalkyl, for example CF$_3$, C$_2$F$_5$, C$_3$F$_7$;
perfluoro-oxyalkylvinylethers CF$_2$=CFOX, wherein X is a C$_1$-C$_{12}$ alkyl, or a C$_1$-C$_{12}$ oxyalkyl, or a C$_1$-C$_{12}$ (per) fluoro-oxyalkyl having one or more ether groups, for example perfluoro-2-propoxy-propyl;
perfluorodioxoles, wherein in formula (IA) instead of R'$_F$ there is one F atom; X$_1$ and X$_2$, equal to or different from each other, are selected between F or R$_F$, preferably X$_1$=X$_2$=CF$_3$;
perfluorovinylethers (MOVE) of general formula $$CFX_{AI}=CX_{AI}OCF_2OR_{AI} \quad (A-I)$$

wherein:
R$_{AI}$ is a C$_2$-C$_6$ linear, branched perfluoroalkyl group, or C$_5$-C$_6$ cyclic group, or a C$_2$-C$_6$ linear or branched perfluoro oxyalkyl group containing from one to three oxygen atoms;
R$_{AI}$ can optionally contain from 1 to 2 atoms, equal or different, selected from the following: Cl, Br, I;
X$_{AI}$=F;
the compounds of general formula:

$$CF_2=CFOCF_2OCF_2CF_2Y_{AI} \quad (A-II)$$

wherein Y$_{AI}$=F, OCF$_3$; in particular (MOVE I) CF$_2$=CFOCF$_2$OCF$_2$CF$_3$ and (MOVE II) CF$_2$=CFOC—F$_2$OCF$_2$CF$_2$OCF$_3$ are preferred.

A further object of the present invention is a polymerization process to obtain amorphous perfluorinated polymers of perfluorodioxoles of formula (IA) having the combination of the above properties.

The polymerization process is carried out in emulsion, suspension or microemulsion wherein the reaction temperature is lower than 60° C., preferably from 30° C. to 50° C., and in the used reactor the reaction mixture is not in contact with metallic parts.

The used radical initiators are, for example, alkaline or ammonium persulphates, superphosphates, or perborates or percarbonates, optionally in combination with ferrous, cuprous or silver salts or other easily oxidizable metals.

When the emulsion polymerization is used, in the reaction medium also anionic, cationic and non ionic, hydrogenated and fluorinated surfactants are usually present, those fluorinated are particularly preferred.

Among the fluorinated surfactants, those anionic having formula:

$R^3_f - X^- M^+$ are particularly preferred, wherein $R^3_f$ is a $C_5-C_{16}$ (per)fluoroalkyl chain or a (per)fluoropolyoxyalkyl chain, $X^-$ is $-COO^-$ or $-SO_3^-$, $M^+$ is selected among: $H^+$, $NH_4^+$, alkaline metal ion. Among the most commonly used, the following are mentioned: ammonium perfluorooctanoate, (per)fluoropolyoxyalkylenes ended with one or more carboxyl groups, etc. See the patents U.S. Pat. No. 4,990,283 and U.S. Pat. No. 4,864,006.

When the suspension polymerization is used, as suspending agents, polyvinylalcohol, alkyl cellulose as, for example, methylcellulose, non ionic fluorinated surfactants are used.

Preferably the microemulsion polymerization of (per)fluoropolyoxyalkylenes is used, according to U.S. Pat. No. 4,789,717 and U.S. Pat. No. 4,864,006, herein incorporated by reference.

Optionally in the polymerization process chain transfers can also be used.

Preferably the used polymerization reactor is coated inside with glass or with inert materials, as, for example, enamels or fluorinated polymers, in particular PTFE, MFA, PFA, FEP, PCTFE. It is possible to also use entirely glass reactors.

Tests carried out by the Applicant by using the metallic material reactors, for example steel, in particular Hastelloy® and AISI 316, commonly used in the preparation of fluoropolymers, have shown that even by using high amounts of initiator it is not possible to obtain the perfluorinated amorphous homopolymers of the present invention having the combination of improved Tg and good mechanical properties. Furthermore corrosion phenomena are noticed on the metal parts of the reactor in contact with the polymerization mixture.

Therefore the preparation of TTD polymers by microemulsion polymerization in steel reactors cannot be carried out, in particular for TTD copolymers having a TTD content higher than or equal to 95% by moles.

Furthermore it has been found by the Applicant that with the processes described in the prior art to obtain the TTD homopolymer, for example the mass polymerization described in U.S. Pat. No. 5,495,028, it is not possible to obtain TTD homopolymers having the combination of the above properties. Indeed the homopolymer of the prior art has, as said, a Tg of about 30° C. lower than that of the TTD homopolymer of the present invention and besides it does not possess the mechanical properties required to be used for preparing manufactured articles for optical applications or membranes for gas separation. See the comparative Examples.

Furthermore this TTD homopolymer has a very low intrinsic viscosity value. See the comparative Examples.

Unexpectedly with the process of the present invention TTD homopolymers and copolymers are obtained, wherein the TTD content is ≧95% by moles, having the above properties.

With the process of the present invention high conversions even higher than 90%, can be obtained. It is possible to obtain also quantitative conversions. The unreacted monomer can be recovered and reused.

The amorphous fluoropolymers of the present invention show good mechanical properties. In particular the films produced with the polymers of the present invention detach, without breaking, from the support where they have been formed. Furthermore the mechanical properties measured according to the ASTM D 638 method are good: the elastic modulus is higher than 1,000 MPa and the stress at break is higher than 20 MPa. The polymers based on the dioxoles of formula (IA) prepared according to the prior art do not allow the determination of the mechanical properties according to the above method since the obtained specimens are brittle and do not resist to the test conditions.

A further object of the present invention are amorphous fluoropolymers as above described, wherein the ionic end groups COF, COOH, their esters, salts or amidic derivatives are completely absent when analyzed by the analytical method described hereunder, said polymers obtainable by treating the amorphous perfluorinated polymers according to the present invention with elemental fluorine, optionally in admixture with inert gases, in an inert solvent at fluorination, in the presence of ultraviolet radiations having a wave length from 200 to 500 nm, by operating at temperatures lower than 100° C., with reaction times from 10 h, preferably from 20 hours, up to 60 h.

The method used to determine the substantial absence of unstable ionic end groups is carried out by Fourier Transform IR spectroscopy by Nicolet® Nexus FT-IR equipment (256 scannings, resolution 2 cm$^{-1}$), by using a sintered polymer powder pellet having a diameter of 5 mm and a thickness from 50 to 300 micron (1.75-10.5 mg of polymer) initially carrying out a scanning between 4000 cm$^{-1}$ and 400 cm$^{-1}$, then by maintaining the pellet for 12 hours in an environment saturated with ammonia vapours and then recording the IR spectrum under the same conditions of the initial spectrum; by elaborating the two spectra by subtracting from the signals of the spectrum related to the untreated specimen (starting spectrum) the corresponding signals of the specimen spectrum after exposure to ammonia vapours, obtaining the "difference" spectrum, which is normalized by the following equation:

$$\frac{\text{"Difference spectrum"}}{[\text{pellet weight}(g)/\text{pellet area }(cm^2)]}$$

measuring the optical densities related to the COOH and COF end groups after the reaction with the ammonia vapours, end groups giving rise with this reactant to detectable peaks; the optical densities are converted into mmoles/kg of polymer by using the extinction coefficients reported in Table 1, page 73 of the publication by M. Pianca et Al. "End groups in fluoropolymers", J. Fluorine Chem. 95 (1999), 71-84 (herein incorporated by reference); the found values show the concentrations of the residual polar end groups in mmoles of polar end groups/kg of polymer. In the spectrum of the polymers obtained by fluorination of homopolymers or copolymers of the dioxoles of formula (IA) prepared by the process according to the present invention, in correspondence of the wave length fields 3600-3500 and 1820-1770 cm$^{-1}$ (COOH group peaks) and 1900-1830 cm$^{-1}$ (COF groups), there are no peaks distinguishable from the irregularities of the IR spectrum base line.

The analysis method of the ionic end groups used herein allows to dose amounts of each end group until the lower limit of 0.05 mmoles/Kg of polymer; in the case of the perfluorinated amorphous polymers of the present invention the IR spectrum, as said, does not show peaks distinguishable from the irregularities of the base line.

The radiation used in the treatment with fluorine of the amorphous perfluorinated polymers of the present invention has a wave length ranging from 200 to 500 nm, emitted, for example, from a Hanau TQ 150 mercury lamp. The reaction temperature preferably ranges from 0° C. to +100° C., more preferably from +20° C. to +50° C.

Preferably the polymer concentration in the solvent is comprised between 1 and 10% by weight.

The usable solvents are perfluorinated solvents, for example perfluoroalkanes, perfluoropolyethers, preferably having a boiling point lower than 200° C., as, for example, Galden® LS165, tertiary perfluoroamines, etc.

The fluorination process to eliminate the ionic end groups is followed by taking samples from the reaction mixture and by analyzing the end group presence by IR spectroscopy, by means of the above method. The process ends when peaks referred to COOH groups (3600-3500 $cm^{-1}$, 1820-1770 $cm^{-1}$) and/or COF groups (1900-1830 $cm^{-1}$) distinguishable from the spectrum base line are no longer detectable.

The Applicant has unexpectedly found, see the comparative Examples, that in the case of the TTD homopolymers and TTD copolymers wherein TTD≧95% by moles of the prior art (U.S. Pat. No. 5,495,028 and U.S. Pat. No. 5,883,477) after they have been subjected to the above fluorinated process, IR spectra according to the above method are obtained, showing that the peaks, corresponding to the —COOH and/or —COF groups, are not completely absent.

In other words the spectra of said copolymers, after fluorination, show residual peaks which, although not quantifiable since lower than the dosage or method sensitivity limits (0.05 mmoles/Kg), are clearly visible and distinguishable from the irregularities of the base line.

On the contrary the polymers prepared according to the present invention are completely free from unstable ionic end groups since in the wave length fields of the COOH and COF groups there are no peaks distinguishable from the irregularities of the IR spectrum base line.

The polymers of the present invention can be used in particular for preparing coatings and for optical applications, in particular in the IR field from 600 to 1800 nm, preferably from 1300 nm to 1550 nm about.

For the latter use it is preferred to employ amorphous perfluorinated polymers according to the present invention having intrinsic viscosity, measured at the temperature of 30° C. in perfluoroheptane (Galden® D80) according to the ASTM D 2857-87 method, comprised between 15 cc/g and 70 cc/g, more preferably between 17 cc/g and 50 cc/g.

Unexpectedly the Applicant has found that the amorphous perfluorinated polymers of the present invention, prepared with the process described hereunder, have the following combination of properties, as above mentioned:
  low refractive index;
  good mechanical properties;
  when subjected to fluorination according to the above described method, they show by IR spectroscopy a complete absence of peaks attributable to the unstable ionic end groups —COOH and/or —COF;
  Tg higher of about 20° C.-30° C. than that of the TTD homopolymers of the prior art.

The fluorination allows to obtain amorphous perfluorinated TTD polymers characterized by a very high transmittance in the IR field from 1300 to about 1550 nm.

An improved Tg value, about 20° C.-30° C. with respect to that of the TTD homopolymers of the prior art, represents an advantage since for many optical applications it is preferred to use polymers having a high Tg, allowing to obtain optical manufactured articles with high use temperatures and maintaining their characteristics for a longer time.

The Applicant has found that the TTD homopolymer and its amorphous perfluorinated copolymers, wherein TTD≧95%, of the present invention show a combination of improved Tg with good mechanical properties, as above mentioned, in comparison with the TTD homopolymers and copolymers of the prior art.

The amorphous perfluorinated homopolymers and copolymers of the present invention, as said, can be used for the above applications.

Other applications of the amorphous perfluorinated polymers of the invention reside in the preparation of high efficiency membranes for the separation of fluids or gases.

For the preparation of membranes for the gas separation, the intrinsic viscosity, determined at the temperature of 30° C. in perfluoroheptane (Galden® D80) according to the ASTM D 2857-87 method, ranges from 20 cc/g to 100 cc/g, more preferably from 40 cc/g to 80 cc/g.

As said above, the improved Tg of the invention polymers allows a higher permeability to gases maintaining unchanged the solubility properties in the fluorinated solvents of the polymers based on the dioxoles of formula (IA), preferably TTD.

What said takes place by using preferably TTD as dioxole, which shows a higher solubility in fluorinated solvents and a lower viscosity, at equal concentration of the polymer, in said solutions with respect to the other perfluorodioxoles.

The following Examples illustrate the present invention without limiting it.

EXAMPLES

Determination of the Polymer Tg
  The Tg is determined by DSC according to the ASTM 3418 method.

Determination of the Intrinsic Viscosity
  The intrinsic viscosity is determined at 30° C. in perfluoroheptane (Galden® D80) according to the ASTM D 2857-87 method.

IR Spectroscopy to Check the Absence of Ionic End Groups
  The IR spectroscopy is carried out by Fourier transform by Nicolet® Nexus FT-IR equipment (256 scannings, resolution 2 $cm^{-1}$), by using a sintered polymer powder pellet having a diameter of 5 mm with a thickness from 50 to 300 micron (1.75-10.5 mg of polymer), initially effecting a scanning between 4000 $cm^{-1}$ and 400 $cm^{-1}$, then maintaining the pellet for 12 hours in environment saturated with ammonia vapours and then recording the IR spectrum under the same conditions of the initial spectrum; by elaborating the two spectra by subtracting from the signals of the spectrum relating to the untreated specimen (starting spectrum) the corresponding signals of the specimen spectrum after exposure to the ammonia vapours, obtaining the "difference" spectrum, which is normalized by the following equation:

$$\frac{\text{"Difference spectrum"}}{[\text{pellet weight}(g)/\text{pellet area }(cm^2)]}$$

by measuring the optical densities related to the COOH and COF end groups after the reaction with the ammonia vapours, end groups giving rise with this reactant to detectable peaks; the optical densities are converted into mmoles/kg of polymer using the extinction coefficients reported in Table 1, page 73 of the publication by M. Pianca et Al. "End groups in fluoropolymers", J. Fluorine Chem. 95 (1999), 71-84 (herein incorporated by reference); the found values show the concentrations of the residual polar end groups in mmoles of polar end groups/kg of polymer.

Example 1

Preparation of the TTD Homopolymer Having Intrinsic Viscosity 20.1 cc/g

In a 0.5 litre glass autoclave, equipped with magnetic anchor, after vacuum has been made by an oil pump, are introduced in sequence 150 ml of demineralized water, 1.5 g/litre $H_2O$ of a microemulsion obtained by mixing:

0.11 ml of a perfluoropolyoxyalkylene having acid end group of formula:

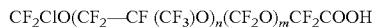

wherein n/m=10, having average molecular weight 600;
0.11 ml of an aqueous solution of $NH_3$ at 30% by volume;
0.22 ml of demineralized water;
0.67 ml of Galden® D02 of formula:

wherein n/m=20, having average molecular weight 450.

The autoclave is heated- to 50° C. and at this temperature 100 g of TTD are added. Subsequently 1 g of potassium persulphate is introduced. The reaction ends after 96 hours. The latex, is degassed. It is coagulated by adding $HNO_3$ at 65% w/w, the polymer is separated from the aqueous phase, washed twice with demineralized water and dried in a stove at 85° C. for 100 h. 80 g of homopolymer have been obtained (80% conversion).

The polymer Tg is 191.1° C. The intrinsic viscosity is equal to 20.1 cc/g.

The polymer has been dissolved at a 5% by weight concentration in the perfluoropolyether solvent Galden® LS 165 having the structure $CF_3-O-(CF_3-CF(CF_3)O)_n-(CF_2O)_m-CF_3$.

By using a film-spreading plate, a film having a thickness of 5 micron is obtained by casting. The film easily detaches from the support and can for example be stretched or bent without cracks take place.

Example 2

Preparation of the TTD Homopolymer Having an Intrinsic Viscosity 37 cc/g

One proceeds as in the Example 1 but feeding 63 g of TTD and 0.1 g of initiator. 63 g of polymer (100% conversion) having Tg of 191.3° C., are obtained. The intrinsic viscosity is equal to 37.0 cc/g.

The film obtained by casting according to the procedure described in Example 1 shows the same above mentioned properties: it easily detaches from the support and can for example be stretched or bent without cracks take place.

The polymer is subjected to fluorination in a 300 ml photochemical glass reactor equipped with mechanical stirrer and an immersion mercury vapour UV lamp (Hanau TQ 150), charging 420 g of solution at 6% by weight in perfluorinated solvent Galden® D 100 (perfluoropolyether having b.p. 100° C.). Nitrogen is fed in the solution for 1 h to remove the oxygen present, then a mixture 1:1 by volume of nitrogen/fluorine is fed in the presence of UV radiations, for 40 h at 35° C. After reaction the residual fluorine and the solvent are eliminated under vacuum.

The IR spectrum determined as above, also expanding the absorbance scale until well showing the base line oscillations due to the ground noise, does not show peaks distinguishable from the base line in correspondence of the wave length ranges 3600-3500 and 1820-1770 $cm^{-1}$ related to the —COOH group and 1900-1830 $cm^{-1}$ related to the —COF group.

Example 3

Preparation of the TTD Homopolymer Having Intrinsic Viscosity 47 cc/g

One proceeds as in the Example 1 but feeding 60.5 g of TTD and 0.01 g of initiator. 14 g of polymer (23% conversion) having Tg 191.1° C., are obtained. The intrinsic viscosity is equal to 47.0 cc/g.

The film obtained by casting according to the procedure described in the Example 1 shows the same above properties: it easily detaches from the support and can, for example, be stretched or bent without cracks take place.

Example 4

Preparation of the TTD Homopolymer Having Intrinsic Viscosity 47.2 cc/g

One proceeds as in the Example 1 but feeding 73.56 g of TTD and 0.1 g of initiator and carrying out the polymerization at 40° C. 57.9 g of polymer (78.7% conversion) having Tg 191.0° C., are obtained. The intrinsic viscosity measured at 30° C. is equal to 47.2 cc/g.

The film obtained by casting according to the procedure described in the Example 1 shows the same above properties: it easily comes off from the support and can for example be stretched or bent without cracks take place.

Example 5 (Comparative)

Preparation of the TTD Homopolymer in Hastelloy Reactor

One proceeds as in the Example 1 but using an Hastelloy reactor having the same capacity as that of Example 1.

The reaction time having elapsed, it is degassed and the coagulating agent is added but the homopolymer precipitation is not noticed. The liquid phase is dried, but no polymeric residue is obtained, confirming that the homopolymer has not formed.

Example 6 (Comparative)

Preparation of the TTD Homopolymer in Hastelloy Reactor by Using a Higher Amount of Initiator One proceeds as in Example 5 but using an initiator amount of 14 g.

The reaction time being elapsed, it is degassed and then the reactor is discharged. The content appears green-coloured, indicating that during the polymerization corrosion phenomea inside the reactor have taken place, as confirmed by the subsequent analysis of the metals contained in the reacted mixture. The coagulating agent is added to the mixture but the homopolymer precipitation is not noticed. The liquid phase is dried, but no polymeric residue is obtained, confirming that the homopolymer has not formed.

Example 7 (Comparative)

Preparation of the TTD homopolymer according to U.S. Pat. No. 5,495,028 (Example 14)

0.075 ml of a solution at 7% of perfluorpropionyl peroxide in $CCl_2FCF_2Cl$ and 5 mmoles of TTD are introduced in a 18 ml glass reactor equipped with magnetic stirring. The reactor is brought to $-196°$ C. and the vacuum is made. After having brought it again to room temperature, it is maintained at 25° C. for 48 hours under stirring. At the end the reactor is degassed eliminating the solvent and the residual monomer. The polymer is put in a stove at 200° C. under vacuum for 5 hours. 0.3 g of polymer in powder (30% conversion) are obtained. The polymer Tg is 162° C.

The polymer is subjected to fluorination as described in the Example 2 and subsequently the IR spectrum is carried out according to the above described methodology.

The spectrum shows peaks distinguishable from the base line, also without expanding the absorbance scale, in correspondence of the wave length ranges 3600-3500 and 1820-1770 $cm^{-1}$ related to the —COOH group and 1900-1830 $cm^{-1}$ related to the —COF group.

Example 8 (comparative)

Example 7 (comparative) is repeated in a 0.5 litre glass reactor, proportionally decreasing the fed substances amounts. 8.4 g of homopolymer (30% conversion) having Tg 162° C. and intrinsic viscosity 8 cc/g, are obtained.

The film obtained by casting according to the procedure described in the Example 1 does not show mechanical consistency and breaks detaching it from the support.

Example 9

Preparation of the TTD Homopolymer Having Intrinsic Viscosity 43.2 cc/g by Emulsion Polymerization In a 0.5 litre glass autoclave, equipped with magnetic anchor, after vacuum has been made by an oil pump, there are introduced in sequence 150 ml of demineralized water, 5 ml of ammonium perfluorooctanoate.

The autoclave is heated to 50° C. and at this temperature 69.3 g of TTD are added. Subsequently 0.1 g of potassium persulphate are introduced. The reaction is stopped after 96 hours. The latex is degassed. It is coagulated by adding $HNO_3$ at 65% w/w, the polymer is separated from the aqueous phase, washed twice with demineralized water and dried in a stove at 85° C. for 100 h. 36 g of homopolymer have been obtained (~52% conversion).

The polymer Tg is 191.1° C. The intrinsic viscosity is equal to 43.2 cc/g.

The polymer has been dissolved at a 5% by weight concentration in the perfluoropolyether solvent Galden® LS 165. By using a film-spreading plate, a film having a thickness of 5 micron is obtained by casting. The film easily comes off from the support and can for example be stretched or bent without cracks take place.

Example 10

Preparation of the Copolymer TFE/TTD 3/97 by Moles

In a 1 litre glass autoclave, equipped with magnetic stirring, after vacuum has been made by an oil pump, are introduced in sequence 350 ml of demineralized water, 15 ml of microemulsion, obtained by mixing:

1.486 ml of a perfluorooxyalkylene having acid end groups of formula:

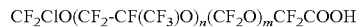

wherein n/m=10, having average molecular weight of 600 g/mole;
1.486 ml of an aqueous solution of $NH_3$ at 30% by volume;
2.973 ml of demineralized water;
9.054 ml of Galden® D02 of formula:

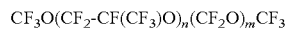

wherein n/m=20, having average molecular weight of 450 g/mole.

174 g of TTD are added. 0.03 MPa of gas TFE equal to 0.72 g are introduced in the reactor. Subsequently 0.1 g of ammonium persulphate are introduced. The autoclave is heated to 50° C. The reaction ends after 12 hours. The latex is degassed. It is coagulated by adding aluminum sulphate, the polymer is separated from the aqueous phase, washed twice with demineralized water and dried in a stove at 120° C. for 16 h.

The polymer Tg is about 184.5° C. The intrinsic viscosity measured at 30° C. in perfluoroheptane (Galden® D80) is equal to 22 cc/g. By IR analysis the polymer results to contain a residual amount of unstable ionic groups COOH of 6 mmoles/kg.

The polymer is fluorinated in the presence of UV light and solvent as described in the Example 1.

The polymer has been dissolved in the perfluoropolyether solvent Galden® LS165 at a concentration 5% by weight. By using a film-spreading plate, a film having a thickness of 5 micron is obtained by casting. The film easily comes off from the support and can, for example, be stretched or bent without cracks take place.

The invention claimed is:

1. Amorphous perfluorinated homopolymers and copolymers of perfluorodioxoles of formula (IA):

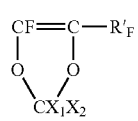

(IA)

wherein $R'_F$ is equal to $OR_F$ wherein $R_F$ is a linear or branched perfluoroalkyl radical having 1-5 carbon atoms; $X_1$ and $X_2$, equal to or different from each other, are F, $CF_3$;

having a dioxole content$\geq$95% by moles, having the following combination of properties:

Tg, measured according to the ASTM 3418 (DSC) method, from 180° C. to 195° C.;

intrinsic viscosity, measured at the temperature of 30° C. in perfluoroheptane according to the ASTM D 2857-87 method, from 13 cc/g to 100 cc/g.

2. Amorphous perfluorinated homopolymers and copolymers according to claim 1, wherein in formula (IA) $R'_F$=$OCF_3$; $X_1$=$X_2$=F (TTD).

3. Amorphous perfluorinated according to claim 1, wherein the comonomers are selected from one or more of the following:

$C_2$-$C_8$ perfluoroolefins, selected between tetrafluoroethylene (TFE), hexafluoropropene (HFP);

perfluoroalkylvinylethers (PAVE) $CF_2$=$CFOR_f$, wherein $R_f$ is a $C_1C_6$ perfluoroalkyl;

perfluoro-oxyalkylvinylethers $CF_2$=CFOX, wherein X is selected from the group consisting of: $C_1$-$C_{12}$ alkyl, $C_1$-$C_{12}$ oxyalkyl, and $C_1$-$C_{12}$ (per)fluoro-oxyalkyl having one or more ether groups;

perfluorodioxoles, wherein in formula (IA) instead of $R'_F$ there is one F atom; $X_1$ and $X_2$, equal to or different from each other, are selected between F or $R_F$;

perfluorovinylethers (MOVE) of general formula $CFX_{AI}=CX_{AI}OCF_2OR_{AI}$ (A-I) wherein:

$R^{AI}$ is selected from the group consisting of: a $C_2$-$C_6$ linear, branched perfluoroalkyl group, a $C_5$-$C_6$ cyclic perfluoro oxyalkyl group, and a $C_2$-$C_6$ linear or branched perfluoro oxyalkyl group containing from one to three oxygen atoms; $R_{AI}$ can optionally contain from 1 to 2 atoms, equal or different, selected from the following: Cl, Br, I;

$X_{AI}=F$.

4. Amorphous perfluorinated homopolymers and copolymers of claim 1, wherein the ionic end groups are completely absent when determined by the analytical method described hereunder, said polymers obtainable by treating with elemental fluorine, optionally in admixture with inert gases, in an inert solvent at fluorination, in the presence of ultraviolet radiations having a wave length from 200 to 500 nm, operating at temperatures lower than 100° C. for reaction times from 10 h to 60 h.

5. Amorphous perfluorinated homopolymers and copolymers according to claim 4, wherein the unstable ionic end groups are COF, COOH, their esters, salts or amidic derivatives.

6. Amorphous perfluorinated homopolymers and copolymers according to claim 4, wherein the radiation used in the fluorination process has a wave length ranging from 200 to 500 nm and the reaction temperature ranges from 0° C. to +100° C.

7. Amorphous perfluorinated homopolymers and copolymers according to claim 4, wherein in the fluorination process the polymer concentration in the solvent is between 1 and 10% by weight.

8. Amorphous perfluorinated homopolmers and copolymers according to claim 4, wherein a perfluorinated solvent is used, selected from perfluoroalkanes, perfluoropolyethers, tertiary perfluoroamines.

9. Amorphous perfluorinated homopolymers and copolymers of claim 1, wherein Tg, measured according to the ASTM 3418 (DSC) method is from 190° C. to 192° C.

10. Amorphous perfluorinated homopolymers and copolymers of claim 1, wherein the comonomers are perfluoroalkylvinylethers (PAVE) $CF_2=CFOR_f$, wherein $R_f$ is $CF_3$, $C_2F_5$, or $C_3F_7$.

11. Amorphous perfluorinated homopolymers and copolymers of claim 1, wherein the comonomers are perfluorooxyalkylvinylethers $CF_2=CFOX$, wherein X is perfluoro-2-propoxy-propyl.

12. Amorphous perfluorinated homopolymers and copolymers of claim 1, wherein the comonomers are perfluorodioxoles, wherein in formula (IA) instead of $R'_F$ there is one F atom and $X_1=X_2=CF_3$.

13. Amorphous perfluorinated homopolymers and copolymers of claim 1, wherein the comonomers are perfluorovinylethers (MOVE I) $CF_2=CFOCF_2OCF_2CF_3$ or (MOVE II) $CF_2=CFOCF_2OCF_2CF_2OCF_3$.

14. Amorphous perfluorinated homopolymers and copolymers of claim 1, wherein the radiation used in the fluorination process has a wave length ranging from 200 to 500 nm and the reaction temperature ranges from +20° C. to +50° C.

15. Amorphous perfluorinated homopolymers and copolymers of claim 1, wherein a perfluorinated solvent is used, selected from perfluoroalkanes and perfluoropolyethers having a boiling point lower than 200° C.

* * * * *